United States Patent [19]

Sander et al.

[11] 4,056,475
[45] Nov. 1, 1977

[54] PULP CATCHER

[75] Inventors: Hanslothar Sander; Siegfried Matusch; Uwe Hemminghaus, all of Braunschweig, Germany

[73] Assignee: Braunschweigische Maschinenbauanstalt, Braunschweig, Germany

[21] Appl. No.: 273,855

[22] Filed: July 21, 1972

[30] Foreign Application Priority Data

July 23, 1971 Germany .............................. 2136850

[51] Int. Cl.$^2$ .............................................. B01D 33/06
[52] U.S. Cl. .................................... 210/402; 209/390; 210/407
[58] Field of Search ............... 210/396, 397, 402, 407, 210/372, 393, 79, 374, 375, 404; 209/386, 390; 15/256.5, 256.52, 256.6; 162/323

[56] References Cited

U.S. PATENT DOCUMENTS

| 1,304,253 | 5/1919 | Bird | 210/396 X |
|---|---|---|---|
| 1,685,084 | 9/1928 | Hoyt | 210/396 X |
| 2,393,150 | 1/1946 | Dayton | 210/396 |
| 3,286,843 | 11/1966 | Kraissl, Jr. | 210/396 X |
| 3,361,262 | 1/1968 | Orr et al. | 210/393 X |

FOREIGN PATENT DOCUMENTS 299,148  10/1928  United Kingdom ................. 209/390

*Primary Examiner*—Frank W. Lutter
*Assistant Examiner*—William A. Cuchlinski, Jr.
*Attorney, Agent, or Firm*—W. G. Fasse; W. W. Roberts

[57] ABSTRACT

The present pulp catcher is provided with a rotating brush roller for cleaning the sieve or straining drum in a container. The shaft ends of the rotating brush roller are movably supported in bearings which are pressed by biasing means radially inwardly relative to the rotational axis of the straining drum. The shaft ends of the rotation brush roller are sealed by stuffing box means which are connected to the container by means of compensating corrugated tubings. The movable support of the shaft ends makes it possible to maintain the rotating brush roller at a most efficient spacing relative to the straining drum even when the bristles of the brush roller become shorter due to wear and tear.

6 Claims, 2 Drawing Figures

PULP CATCHER

BACKGROUND OF THE INVENTION:

The present invention relates to a pulp catcher including a substantially horizontally arranged sieve or straining drum located in a container. The depulped juice is removed from the straining drum through a hollow shaft. The outer surface of the straining drum is cleaned by means of a rotating brush roller. Near the bottom of the container there are arranged means for transporting the pulp, for example, by means of a screw or worm to a substantially centrally located outlet pipe.

Several pulp catchers of differing constructions are known in the art. One type of pulp catcher comprises a rotating sieve or straining drum for separating the juice from the pulp proper. This type of pulp catcher requires cleaning means for the straining drum in order to keep the sieve apertures open and for removing the pulp from the surface of the straining drum. Another type of pulp catcher comprises a straining drum which is arranged substantially vertically. In this type of catcher, the straining surface of the drum is cleaned by means of stationary doctor blades which are pressed against the rotating drum. Depending upon the type of operation, that is whether the juice flows from the inside of the drum to the outside thereof or vice versa, the doctor blades are arranged either on the inside or on the outside of the straining drum.

The present invention aims at improving the known type of pulp catchers which comprise a sunstantially horizontally arranged straining drum, wherein the juice flows from the outside of the drum to the inside thereof and wherein the straining drum is cleaned by a rotating brush roller. Compared to the pulp catcher with a stationary doctor blade, the pulp catcher with a rotating brush roller has the advantage that a higher relative motion or speed may be accomplished during the cleaning by rotating the brush roller and the straining drum in opposite directions. Doctor blades have the further disadvantage that a portion of the pulp may be pressed into the sieve apertures of the straining drum whereby the apertures may be clogged for longer periods of time. Contrary thereto a rotating brush roller provides a substantially larger assurance that the sieve apertures of the straining drum will be kept free and unclogged.

However, pulp catchers with rotating brush rollers have the drawback that the rotating brush rollers are subject to a substantial wear and tear. Due to the fact tha the brush rollers in prior art devices are arranged with their rotational axis at a fixed spacing from the straining drum, it cannot be avoided that due to the wear and tear of the brush bristles, the cleaning efficiency is varied. The optimal cleaning efficiency is achieved only during a limited time of operation; namely, subsequently to installing a new brush roller. Subsequent to said limit operational time the disadvantage could not be avoided heretofore, that the sieve of the straining drum is cleaned unsatisfactorily.

It would be possible to assure a continuously satisfactory cleaning of the straining drum by a respectively frequent changing of the brush roller. However, this is uneconomical due to the high consumption of brush rollers. Besides, the exchange of the brush rollers would cause frequent interruptions of the operation because the brush roller can be exchanged only when the pulp catcher is at a standstill.

OBJECTS OF THE INVENTION

In view of the above, it is the aim of the invention to achieve the following objects singly or in combination:

to remove the above drawbacks of the prior art, more specifically, to improve a pulp catcher of the rotating brush roller type in such a manner that the disadvantages are avoided while simultaneously assuring the above outlined advantages of this type of pulp catcher;

to provide means for compensating the reducing diameter of the brush roller as its diameter becomes smaller due to wear and tear;

to provide means which will bias the brush roller against the straining drum with a pressure just sufficient for achieving an optimal cleaning effect, whereby such pressure is to be continuously maintained for continuously assuring a satisfactory cleaning of the straining drum; and to arrange the bristles of the brush roller in helical lines about the body of the brush roller so that the brush roller itself will act as a transporting screw or worm for the pulp.

SUMMARY OF THE INVENTION

According to the invention there is provided a pulp catcher which has a straining drum rotatably mounted in a container together with a brush roller the shaft ends of which are movably supported in bearings which are movable radially in the direction toward the center or rotational axis of the straining drum. The movable bearings are biased in said radial direction and the shaft ends are sealed by means of stuffing boxes which are connected to the container by means of compensating corrugated tubings.

Due to the biasing, for example by spring means of the brush roller against the straining drum, it is possible to assure at any time the contact between the brush roller and the outer surface of the straining drum which is required for an optimal cleaning of said straining drum surface. This contact is assured independently of the instantaneous wear and tear condition or the given diameter of the brush roller because the contact is accomplished by a respective displacement of the bearings of the brush roller. These radial movements in the direction toward the rotational axis of the straining drum, which movements are required for maintaining the just described contact are accomplished automatically due to the biasing means.

Another advantage of the invention is seen in that as compared to prior art pulp catchers, the brush roller according to the invention is utilized to its fullest extent because an exchange becomes necessary only after the bristles have become so short that a satisfactory cleaning is not assured any more. Accordingly, the brush rollers are used in a rather economical and thus advantageous manner. Moreover, a pulp catcher according to the invention can be operated continuously with a reliably cleaned straining drum, although, surprisingly, the requirement for brush rollers is substantially smaller according to the invention as compared to prior art pulp catchers.

According to a suitable embodiment of the invention the brush roller may be driven by drive means comprising a so called slip on gear drive. According to a further embodiment, the bristles of the brush roller may be arranged in helical form, whereby the entire structure of the pulp catcher is substantially simplified because the extra worm or screw for transporting the pulp and the bearing means for such screw as well as the drive means for this screw are not obviated.

BRIEF FIGURE DESCRIPTION

In order that the invention may be clearly understood, it will now be described, by way of example, with reference to the accompanying drawings, wherein:

FIG. 1 illustrates a somewhat schematic sectional view through a pulp catcher according to the invention whereby the sectional plane extends vertically through the rotational axis of the straining drum; and FIG. 2 shows an end view with the end wall removed of another embodiment of a pulp catcher according to the invention whereby the view is in the direction of the Arrow A in FIG. 1.

DETAILED DESCRIPTION OF EXAMPLE EMBODIMENTS

Figure 1:
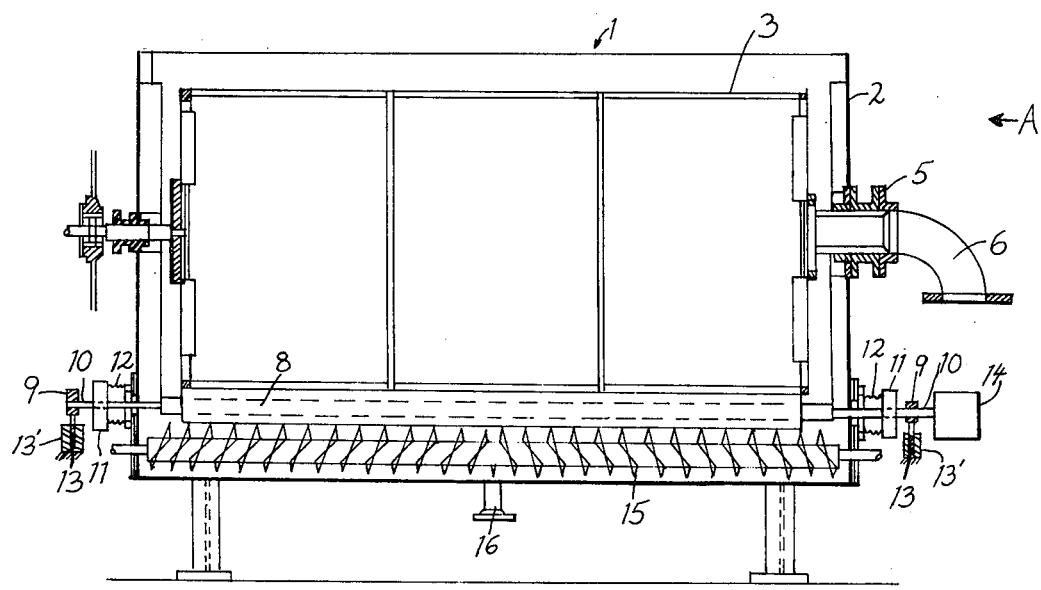
Figure 2:
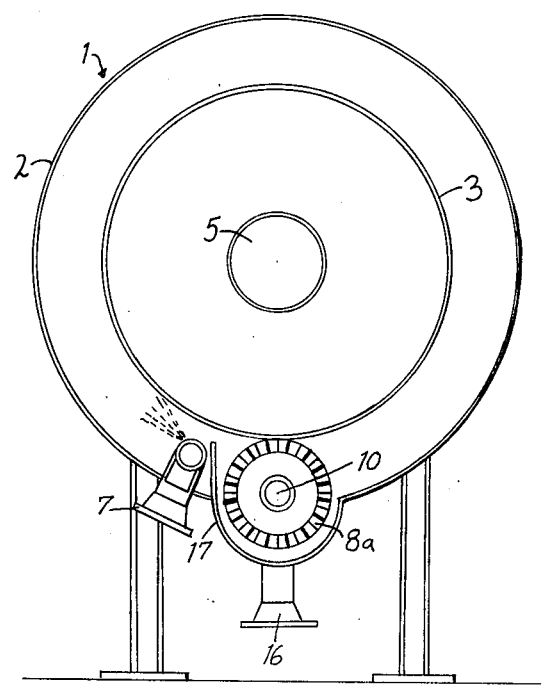

The pulp catcher 1 as illustrated in FIGS. 1 and 2 comprises a container 2 in which there is arranged a sieve or straining drum 3. The straining drum 3 comprises the shape of a cylinder arranged in a substantially horizontal position. The straining drum is rotatably supported in the wall of the container 2 by means of a shaft stud 4. The drum is further connected to a drive device and the bearing is of the liquid tight type. A hollow shaft 5 is rotatably supported at the other end of the straining drum 3 in the respective wall of the container 2. The hollow shaft 5 is also sealed in a liquid tight manner and has connected to its outer end a removal conduit 6. The depulped juice is removed from the pulp catcher through said conduit 6.

The juice to be depulped is supplied into the container 2 at its lower range through a raw juice inlet nipple 7 as best seen in FIG. 2. The raw juice flows in the direction from the outside of the straining drum to the inside thereof. The pulp is deposited on the outer surface of the straining drum 3.

Vertically below the rotational axis of the straining drum 3 there is arranged a brush roller 8 which is supported or guided in bearings 9 which in turn are arranged outside of the container 2 but which are movable or shiftable in a direction extending radially relative to the rotational axis of the straining drum 3, for example, in guide channels 13' known as such. The shaft ends 10 by means of which the brush roller 8 extends into the bearings 9, are sealed relative to the container 2 by means of stuffing boxes 11. These boxes in turn are connected to the container 2 by means of compensating corrugated piping 12. In this manner, the sealing of the shaft ends 10 is assured in spite of the radial movability of the bearings 9.

The bearings 9 are biased by suitable means, for example, by the springs 13 shown symbolically in FIG. 1. The resulting biasing pressure continuously maintains the required contact between the outer surface of the straining drum 3 and the brush roller 8. An attachment gear box 14 is arranged on one shaft end 10 for rotating the brush roller 8 in a direction opposite to the direction of rotation of the staining drum 3.

The pulp which is cleaned off the outer surface of the straining drum 3 due to the rotation of the brush falls downwardly and thus comes into the operational range of a feed srew 15 arranged near the bottom of the container 2. This feed screw transports the pulp toward a substantially centrally located removal pipe 16 through which the pulp is conveyed.

In the alternative embodiment of the pulp catcher 1 as shown in FIG. 2 a brush roller 8a is provided which is distinguished from the embodiment according to FIG. 1 in that the bristles are arranged in a row forming a helical line. In this manner, the rotating brush roller 8a acts simultaneously as a transport screw or worm for the pulp, whereby the extra transport screw 14 as shown in FIG. 1 is obviated.

FIG. 2 further illustrates that the raw juice inlet nipple 7 is separated within the container 2 from the space in which the brush roller 8 or 8a rotates by means of a separation wall 17 which prevent that the fresh raw juice creates uncontrollable current in the range of said brush rollers 8 or 8a.

Although the invention has been described with reference to specific example embodiments, it is to be understood, that it is intended to cover all modifications and equivalents within the scope of the appended claims.

What is claimed is:

1. A strainer apparatus comprising a housing, straining drum means having a rotational axis, means rotatably supporting said straining drum means in said housing, means connected to said housing to supply material to be strained into said housing, further means also connected to said housing to remove separated material and liquid from said housing, said further means being arranged to maintain a liquid level in said housing, rotatable brush roller means including shaft means located in said housing below said liquid level, sealing means in said housing below said liquid level, said shaft means having ends extending through said sealing means out of said housing, bearing means movably supported outside said housing for rotatably supporting said shaft ends, biasing means operatively connected to said bearing means to urge said bearing means radially toward said rotational axis, and compensating means operatively interconnecting said sealing means and said housing.

2. The apparatus according to claim 1, wherein said sealing means comprise stuffing box means, through which said shaft ends extend, and wherein said compensating means comprise corrugated tubing members extending between said housing and said stuffing box means.

3. The apparatus according to claim 1, wherein said biasing means comprise spring means which support said bearing means.

4. The apparatus according to claim 1, further comprising dirve means operatively connected to said brush roller means, said drive means comprising a shaft member supported by said bearing means and attachment gear means on one end of said shaft member, the other end of which extends through said sealing means.

5. the apparatus according to claim 1, wherein said rotatable brush roller means comprise material moving means in the form of a row of brush bristles extending in helical fashion about said shaft means whereby the helical rows of bristles operate as a worm gear for transporting said material in said housing.

6. The apparatus according to claim 1, wherein said further means comprise a hollow shaft arranged coaxially with said rotational axis and pipe means connected to said hollow shaft for the discharge of liquid from said housing.

* * * * *

Erratum

4,056,475.—*Hanslothar Sander*, *Siegfried Matusch* and *Uwe Hemminghaus*, PULP CATCHER. In the notice of Disclaimers appearing on page 11 in the Official Gazette of Feb. 12, 1980, all references to Patent No. 4,056,475, should be deleted as the patent should not have been disclaimed.

Dedication 4,056,475.—*Hanslothar Sander*, *Siegfried Matusch* and *Uwe Hemminghaus*, Braunschweig, Germany. PULP CATCHER. Patent dated Nov. 1, 1977. Dedication filed Nov. 28, 1979, by the assignee, *Braunschweigische Maschinenbauanstalt*.

Hereby dedicates the entire remaining term of said patent.

[*Official Gazette, April 1, 1980.*]